United States Patent [19]
Price

[11] Patent Number: 5,679,187
[45] Date of Patent: Oct. 21, 1997

[54] BOUNCE DAMPING IN ELASTOMERIC TIRES

[75] Inventor: Robert J. Price, Dunlap, Ill.

[73] Assignee: Caterpillar Inc., Peoria, Ill.

[21] Appl. No.: 530,812

[22] Filed: Sep. 20, 1995

[51] Int. Cl.$^6$ ................................................. B60C 23/00
[52] U.S. Cl. .................... 152/415; 141/38; 152/DIG. 5
[58] Field of Search ............................ 152/415, DIG. 5; 141/38

[56] References Cited

U.S. PATENT DOCUMENTS

| | | | |
|---|---|---|---|
| 852,130 | 4/1907 | Magowan | 152/79 |
| 2,526,164 | 10/1950 | Slemmons | 152/312 |
| 3,134,420 | 5/1964 | McConkie | 152/429 |
| 3,601,174 | 8/1971 | Shotwell et al. | 152/211 |
| 3,618,652 | 11/1971 | Marshall et al. | 152/5 |
| 4,169,497 | 10/1979 | Tsuruta | 152/418 |
| 4,298,047 | 11/1981 | Bobard | 152/417 |
| 4,343,338 | 8/1982 | Hart | 152/153 |
| 5,031,679 | 7/1991 | Shoner | 152/157 |

FOREIGN PATENT DOCUMENTS

| | | |
|---|---|---|
| 345150 | 11/1904 | France . |
| 928790 | 12/1947 | France . |
| 1180870 | 6/1959 | France . |
| 680108 | 10/1952 | United Kingdom . |

*Primary Examiner*—Michael W. Ball
*Assistant Examiner*—Francis J. Lorin
*Attorney, Agent, or Firm*—J. W. Burrows

[57] ABSTRACT

Damping of the bounce in elastomeric tires is desirable to eliminate the tendency of a machine, such as a loader, to lope or bounce when carrying a load for a distance. The subject invention substantially reduces the lope or bounce by filling the cavity or closed chamber of a tire of a wheel assembly with a liquid, mounting an accumulator to a rim, and controllably interconnecting the closed chamber and the accumulator. By controlling the rate of fluid flow between the closed chamber and the accumulator, the elastomeric tire retains some resiliency while forcing the springs and shock absorbers of the machine to control the tendency for the machine to bounce or lope.

5 Claims, 2 Drawing Sheets

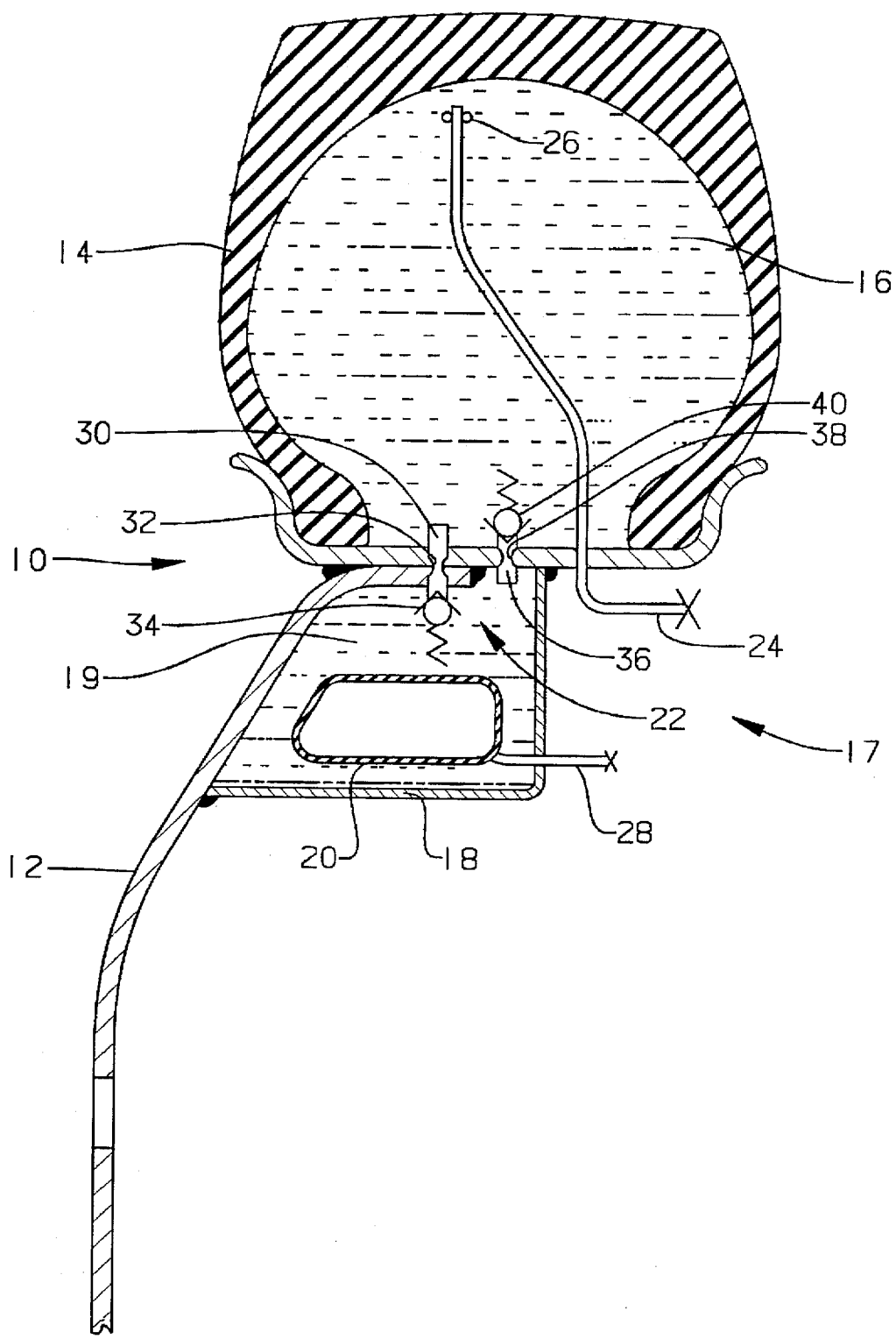
Fig_1

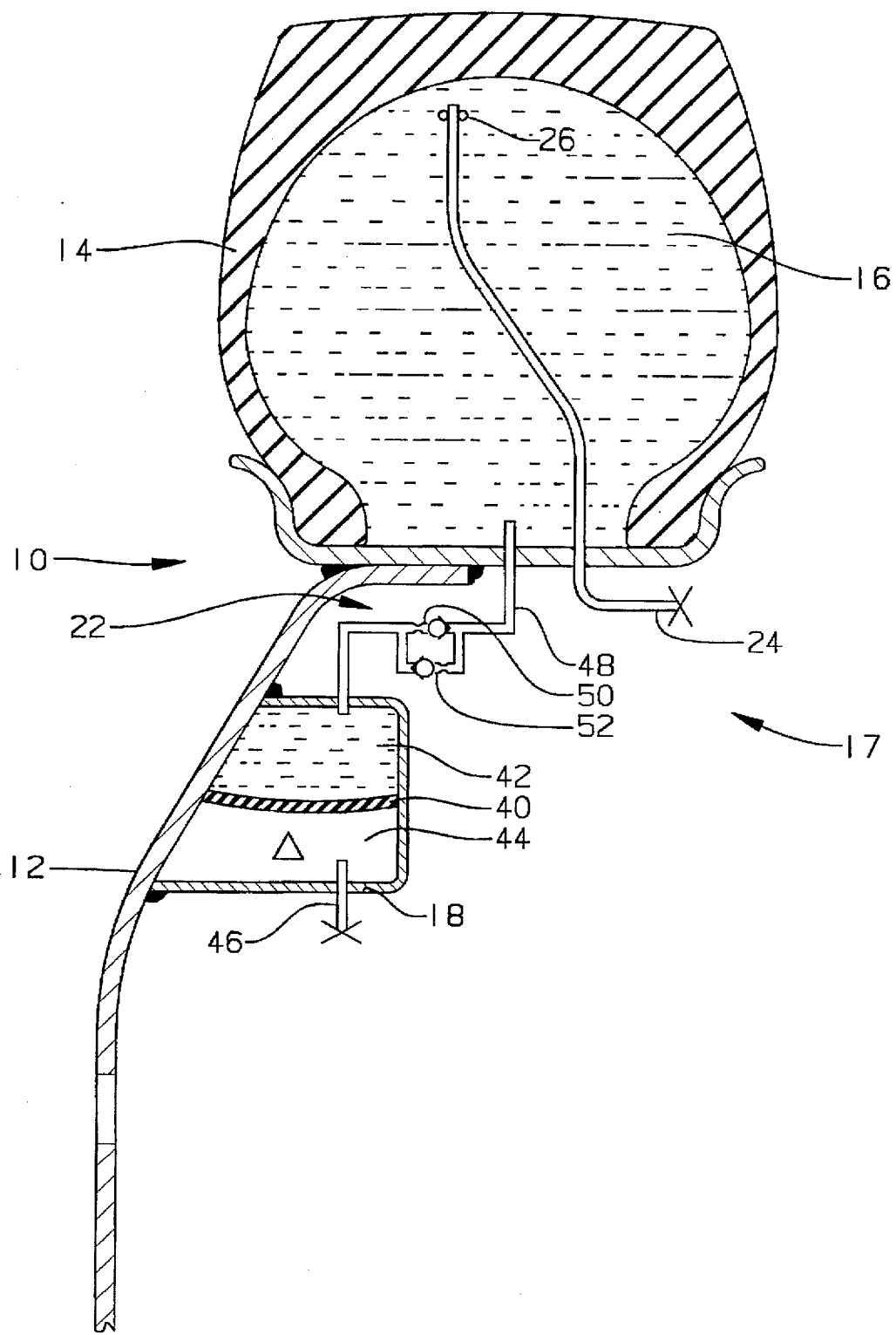
Fig_2_

5,679,187

BOUNCE DAMPING IN ELASTOMERIC TIRES

TECHNICAL FIELD

This application relates generally to controlling bounce in a machine tire and more particularly to damping bounce in elastomeric tires on a vehicle.

BACKGROUND ART

It is well known that wheel assemblies having elastomeric tires mounted on rims and filled with air are readily compressible to varying degrees depending on applied loads and road conditions. If the road is rough or wavy, the machine will have a tendency to lope or bounce due to the effective weight of the machine acting on the air filled elastomeric tires varying as the machine travels the rough or wavy road. If the machine is carrying an additional load, the lope or bounce may become more pronounced. Many designs have been made to attempt to overcome this problem. Most of these designs have added costly components which adds to the overall cost of the wheel assembly. Others that at are simpler are likewise less efficient. It is desirable to provide an apparatus that is simple, inexpensive and effective to substantially reduce the lope or bounce in a machine as it travels a rough or wavy road.

The present invention is directed to overcoming one or more of the problems as set forth above.

DISCLOSURE OF THE INVENTION

In one aspect of the present invention, a bounce damping apparatus is provided for use in a wheel assembly having an elastomeric tire mounted on a rim that defines a closed chamber. A conduit is disposed on the rim between the closed chamber and the exterior thereof and adapted to permit filling of the closed chamber with a liquid. An accumulator is mounted on the rim and a fluid communication mechanism is interconnected between the closed chamber and the accumulator.

In another aspect of the present invention, a method is provided for damping the bounce in a wheel assembly having an elastomeric tire mounted on a rim that defines a closed chamber between the tire and the rim. The method comprises the steps of filling the closed chamber with a liquid, mounting an accumulator on the rim, and controllably interconnecting the closed chamber with the accumulator.

BRIEF DESCRIPTION OF THE DRAWINGS

FIG. 1 is a diagrammatic representation of a tire and wheel incorporating an embodiment of the present invention; and FIG. 2 is a diagrammatic representation of another embodiment of the subject invention.

BEST MODE FOR CARRYING OUT THE INVENTION

Referring to FIG. 1, a wheel assembly 10 is illustrated and includes a rim 12, an elastomeric tire 14 mounted on the rim 12 to define a closed chamber 16 therebetween. A bounce damping apparatus 17 is disposed on the wheel assembly 10 and includes an accumulator 18 having an interior chamber 19 with a gas filled bladder 20 disposed therein, and a fluid communication mechanism 22 disposed between the accumulator and the closed chamber 16. In the subject arrangement, the accumulator 18 is located on the rim 12 immediately adjacent the closed chamber 16 of the elastomeric tire 14.

A flexible conduit 24 is disposed on the rim 12 between the closed chamber 16 and the exterior thereof and is operative to provide a passageway to introduce a liquid into the closed chamber 16. A float device 26 is secured to the end of the flexible conduit 24 within the closed chamber 16 to maintain the end of the conduit above the fluid level in order to ensure that the closed chamber 16 is substantially filled with the liquid during the filling process.

A conduit 28 is connected between the gas filled bladder 20 and the exterior of the accumulator 18 so that the pressure in the bladder may be adjusted for different operating or load conditions.

The fluid communication mechanism 22 includes a first conduit 30 disposed between the interior chamber 19 of the accumulator and the closed chamber 16 of the elastomeric tire 14. The first conduit 30 has a flow restrictor, such as an orifice 32, and a check valve 34 disposed therein. The check valve 34 is operative to permit flow from the closed chamber 16 to the accumulator and inhibit reverse flow. A second conduit 36 is disposed between the interior chamber 19 and the closed chamber 16. The second conduit 36 has a flow restrictor, such as an orifice 38, and a check valve 40 disposed therein. The check valve 40 is operative to permit flow from the interior chamber 19 of the accumulator to the closed chamber 16 of the tire 14 and inhibit reverse flow. The size of the orifices 32,38 is determined by the desired requirements. In most applications, the orifice 38 will be larger than the orifice 32. It is also recognized that if both of the orifices are the same size, then only one conduit with only one flow restrictor therein is needed. The use of a single orifice eliminates the need for the check valves 34,40.

Referring to FIG. 2, another embodiment of the subject invention is illustrated. Like elements have like element numbers. The accumulator 18 of FIG. 2 is mounted on the rim 12 spaced from the closed chamber 16 and has an elastomeric membrane 40 which divides the interior chamber 19 into a fluid chamber 42 and a gas chamber 44. A conduit 46 is disposed on the accumulator 18 between the gas chamber 44 and the exterior of the accumulator and operative to permit changing of the air pressure within the air chamber 44.

The fluid communication mechanism 22 of FIG. includes a single conduit 48 connected between the fluid chamber 42 of the accumulator 18 and the closed chamber 16 of the elastomeric tire 14. First and second orificed checks are disposed in parallel in the single conduit 48. The first orificed check 50 permits controlled flow from the closed chamber 16 to the fluid chamber 42 and inhibits reverse flow. The second orificed check 52 permits controlled flow from the fluid chamber 42 to the closed chamber 16 and inhibits reverse flow. As discussed with respect to FIG. 1 above, the sizes of the orifices may be varied for different applications. Additionally, the respective orifices 50,52 may be variable orifices that are remotely controlled during operation in order to more precisely tune the bounce damping as the operating conditions vary.

It is recognized that the subject invention could be utilized on machines having no additional suspension or on a machine having springs and/or shock absorbers. In machines having springs and/or shock absorbers, a large amount of the force from the reaction to bumps is transferred to the machine's springs and shock absorbers. The degree of compression of the tires is held to a minimum. Furthermore, even though a tubeless type tire is illustrated, it is recognized that a tube type tire could be utilized without departing from the essence of the invention. When using a tube type tire, the tube would be filled with the liquid and then the stem of the tube would be connected to the accumulator.

Industrial Applicability

In the operation of the embodiment of FIG. 1, the closed chamber 16 of the tire is filled with a liquid through the conduit 24 and the bladder 20 is filled with a gas to the desired pressure level. As the machine travels over a rough or wavy road, fluid is permitted to flow between the closed chamber 16 of the tire 14 and the interior chamber 19 of the accumulator 18. The orifices 32,38 control the rate of flow between the respective chambers 16,19. When the tire 14 encounters a bump in the road, the reaction force created by the weight of the machine is transferred to the tire. Since the closed chamber of the tire is filled with a liquid, the tire cannot readily compress. The force attempting to compress the tire 14 forces the liquid in the closed chamber 16 to flow across the orifice 32 of the first conduit 32 against the force of the accumulator 18. Once the tire 14 exits the bump, the accumulator 18 forces the fluid across the second orifice 38 in the second conduit 36 to maintain the closed chamber 16 of the tire filled with fluid. Any tendency of the machine to bounce is very quickly eliminated since fluid must once again be forced across the first orifice 32 against the force of the accumulator 18. By having the second orifice 38 sized larger than the first orifice 32, the deflection of the tire 14 can be more quickly overcome prior to the compression force of the bounce being once again subjected to the tire 14.

The operation of the system of FIG. 2 is substantially the same as that of FIG. 1. The only difference is in the structure of the fluid communication mechanism 22. The structure of FIG. 2 would allow existing wheel assemblies to be readily retrofitted with the subject bounce damping apparatus 17.

In view of the foregoing, it is readily apparent that the bounce damping apparatus 17 provides a simple, inexpensive and effective apparatus to control the bounce in elastomeric tires 14.

Other aspects, objects and advantages of the invention can be obtained from a study of the drawings, the disclosure and the appended claims.

I claim:

1. Bounce damping apparatus for use in a wheel assembly having an elastomeric tire mounted on a rim to define a closed chamber, comprising:

a fill conduit disposed on the rim between the closed chamber and the exterior thereof and adapted to permit filling of the closed chamber with a liquid;

an accumulator mounted on the rim; and a fluid communication mechanism interconnecting the closed chamber with the accumulator, the fluid communication mechanism controls the rate of flow from the accumulator to the closed chamber at a rate different than the rate of flow from the closed chamber to the accumulator.

2. The bounce damping apparatus of claim 1 wherein the fluid communication mechanism includes a first conduit having a flow restrictor of a first predetermined size disposed therein with a check valve which allows fluid flow from the closed chamber to the accumulator and a second conduit having a flow restrictor of a second predetermined size disposed therein with a check valve which allows fluid flow from the accumulator to the closed chamber.

3. The bounce damping apparatus of claim 2 wherein the size of the orifice in the first conduit is larger than the size of orifice in the second conduit.

4. The bounce damping apparatus of claim 1 wherein the fluid communication mechanism includes a single conduit having first and second orificed check valves of different sizes disposed therein in parallel, the single conduit being interconnected between the closed chamber of the tire and the accumulator.

5. The bounce damping apparatus of claim 4 wherein the size of the orificed check that permits flow from the accumulator into the closed chamber is larger than the size of the orificed check that permits flow from the closed chamber to the accumulator.

* * * * *